United States Patent
Nyberg et al.

(10) Patent No.: US 8,223,817 B2
(45) Date of Patent: Jul. 17, 2012

(54) METHOD AND ARRANGEMENT FOR FREQUENCY HOPPING IN WIRELESS COMMUNICATION SYSTEMS WITH CARRIERS OF VARYING BANDWIDTH

(75) Inventors: Henrik Nyberg, Stockholm (SE); Per Skillermark, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1050 days.

(21) Appl. No.: 12/159,455

(22) PCT Filed: Dec. 29, 2005

(86) PCT No.: PCT/SE2005/002060
§ 371 (c)(1),
(2), (4) Date: Jun. 27, 2008

(87) PCT Pub. No.: WO2007/075133
PCT Pub. Date: Jul. 5, 2007

(65) Prior Publication Data
US 2008/0298434 A1     Dec. 4, 2008

(51) Int. Cl.
*H04B 1/00* (2006.01)
(52) U.S. Cl. ........ 375/132; 375/130; 375/133; 375/135; 375/136; 375/141
(58) Field of Classification Search .............. 375/130, 375/131, 132, 135, 136, 140, 142, 146, 147, 375/150, 219, 229, 295, 316, 350
See application file for complete search history.

(56) References Cited

U.S. PATENT DOCUMENTS

| | | | |
|---|---|---|---|
| 7,542,504 B2* | 6/2009 | Chang et al. | 375/132 |
| 7,990,843 B2* | 8/2011 | Laroia et al. | 370/208 |
| 2006/0002451 A1 | 1/2006 | Fukuta et al. | |
| 2006/0018279 A1* | 1/2006 | Agrawal et al. | 370/330 |
| 2006/0233124 A1* | 10/2006 | Palanki | 370/319 |
| 2007/0097853 A1* | 5/2007 | Khandekar et al. | 370/208 |
| 2007/0211616 A1* | 9/2007 | Khandekar et al. | 370/203 |

OTHER PUBLICATIONS

NTT DoCOMO, Channel-Dependent Packet Scheduling for Single-Carrier FDMA in Evolved UTRA Uplink, R1-051390, TSG-RAN WG1 #43, Seoul, Korea, Nov. 7-11, 2005, Retrieved on Sep. 19, 2006 from the Internet: http://www.3gpp.org/ftp/tsg_ran/WG1_RL1/TSGR1_43/Docs/R1-051390.zip.

* cited by examiner

*Primary Examiner* — Hirdepal Singh (57) ABSTRACT

The present invention relates to frequency hopping in wireless communication systems utilizing single-carriers with varying bandwidth. Frequency hopping is made possible by dividing the available bandwidth, associated to the available frequency spectrum, in a leveled structure, a bandwidth tree. By the use of a frequency hopping tree, which has the same structure as the bandwidth tree and wherein each leaf represent a hopping sequence, a frequency hopping scheme is determined. Orthogonality in-between the frequency hopping schemes for different users is ensured by letting a users hopping sequence value at a level n, be dependent on the hopping sequence value associated to the same branch structure on the adjacent level closer to the root of the tree, n−1, and an input sequence associated with the level n.

27 Claims, 8 Drawing Sheets

METHOD AND ARRANGEMENT FOR FREQUENCY HOPPING IN WIRELESS COMMUNICATION SYSTEMS WITH CARRIERS OF VARYING BANDWIDTH

FIELD OF INVENTION

The present invention relates to frequency hopping in wireless communication systems. In particular, the present invention relates to the frequency hopping schemes that are applicable to communication systems utilizing carriers with varying bandwidth.

BACKGROUND OF THE INVENTION

In a plurality of the wireless communication systems presently used, such as GSM, frequency hopping is utilized to achieve frequency diversity and interference diversity. Frequency diversity is wanted primarily to mitigate the effects of Rayleigh fading, i.e. that for given positions of a transmitter and a receiver a signal of certain frequency may experience a substantial attenuation, or fading, while a signal of another frequency is substantially less attenuated. Interference diversity, in particular inter-cell interference diversity can be used to increase the capacity of, and/or optimize the transmission power in, the communication system.

The principles of frequency hopping as used in the prior art will be exemplified primarily with GSM. Prior Art FDMA systems utilizes a fixed bandwidth for each carrier, in GSM corresponding to 200 kHz, which is shared between 8 possible users in a time division multiple access (TDMA) arrangement. Arguable a frequency range is used for each communication between a base station and a mobile station; however, the term commonly used is that a frequency $f_1$, also referred to as carrier or carrier frequency, is used for the communication, and another frequency $f_2$ is used for the communication between the base station and another mobile station, for example. Each cell/base station has a number of carriers, or frequencies, assigned to it, in a pattern chosen to minimize interference in-between cells. Upon setting up a call, the mobile station is assigned a frequency: the frequency $f_1$, and the timeslot $T_3$, for example. And an identifier of the frequency hopping sequence used for that connection, and the time of its frequency hopping clocking in order to enable that the mobile station and the base station use the same frequency at the same time. The carrier frequencies are changed in predetermined patterns according to the identified frequency hopping sequence. In GSM 64 different patterns are provided for and the selection has to be communicated to all entities affected by the frequency hopping.

The above described possible advantages with frequency hopping is recognized in the art and frequency hopping is provided for in a plurality of presently used, or proposed, systems. As the bandwidth is fixed, the implementation is rather straightforward: the system changes carrier frequencies among the frequencies assigned to the cell during a communication. A comprehensive overview of frequency hopping and its advantages in GSM is to be found in "Interference Diversity as Means for Increased Capacity in GSM" by H. Olofsson et al., Proceedings of EPMCC'95.

The frequency hopping methods outlined above may be extended also to certain multi-carrier systems with variable transmission bandwidth, i.e. to systems wherein the overall transmission bandwidth is a multiple of the basic transmission bandwidth, and wherein the transmission supports fragmented frequency assignment. Such systems are described in Laroia et al "Designing a Mobile Broadband Wireless Access Network", IEEE Signal Processing Magazine, September 2004.

The prior art frequency hopping schemes as exemplified above are typically not applicable to systems using variable bandwidth single-carrier transmission, since these schemes put additional constraints on the frequency hopping scheme. Such single-carrier transmission is e.g. considered as a candidate scheme in the uplink of Evolved UTRA as described in TR 25.814 "Physical Layer Aspects of Evolved UTRA" (2005-11), part 9.1.1. Both localized and distributed single-carrier schemes are considered. The latter is sometimes also referred to as Interleaved Frequency Division Multiple Access, IFDMA. Similarly, multi-carrier transmission with non-fragmented (localized) or distributed (but regular) spectrum allocation is not supported by the prior art frequency hopping schemes referred to above.

It would be of high value to be able to utilise the advantages offered by frequency hopping, also in systems not using fixed bandwidth allocation.

SUMMARY OF THE INVENTION

Obviously an improved frequency hopping method, that is applicable also to systems using variable bandwidth single-carrier transmission and system using distributed but regular bandwidth allocation such as IFDMA, is needed.

The object of the present invention is to provide a method and arrangement that overcome the drawbacks of the prior art techniques.

In the method according to the present invention, adapted for use in single carrier variable bandwidth wireless communication systems, a radio base station and an user equipment are engaged in, or maintaining, a communication session using a continuous part of the available frequency spectrum. According to the method, the available bandwidth, associated with the available frequency spectrum, is divided in a leveled structure, wherein the available bandwidth at each new level, n, splits a bandwidth portion at the preceding level into a plurality of new pieces, whereby all possible combinations of bandwidth splitting forms a hierarchical tree-like structure, the bandwidth tree, and a branch going to a certain level in the tree identifies a carrier frequency with a specific level dependent bandwidth. Frequency hopping at a certain level is performed by switching between the different branches of the bandwidth tree at the specified level. Orthogonality in-between the hopping sequences at different levels is ensured by the constraint that a branch switching sequence at one level, n, is dependent on a branch switching sequence at the adjacent higher level, n−1.

In a preferred embodiment of the method according to the present invention bandwidth is assigned for a communication session by determining a position in a hopping sequences tree, said hopping sequence tree having the same tree structure as the bandwidth tree, and wherein each leaf represent a hopping sequence. The position is transferred from the base station to the user equipment. During the session, hopping sequences values for each time instance are determined, based on the position in the hopping sequence tree, wherein the hopping sequence value at the level n, is dependent on the hopping sequence value associated to the same branch structure on the level above, n−1, and an input sequence associated with the level n.

The invention provides means to realize frequency hopping for variable bandwidth signals with non-fragmented spectrum, e.g., for a single-carrier signal supporting variable bandwidth transmission. Frequency hopping provides frequency diversity and, in cellular type of networks, inter-cell interference diversity and intra-cell (adjacent channel) interference diversity.

The invention provides means to realize frequency hopping also in systems that uses distributed but regular bandwidth allocation such as IFDMA.

One advantage of the present invention is that thanks to the use of a bandwidth tree and a hopping sequence tree, generated from the bandwidth tree, and a set of previously distributed input sequences, frequency hopping sequences can be generated in the base station and/or the user equipment with very limited amount of information exchanged between the two in a communication setup. In the preferred embodiment only a position in the hopping sequence tree needs to be exchanged, for example, as a level indicator and a leaf indicator.

A further advantage afforded by the method according to the present invention is that interference diversity between base stations can be achieved relatively easy by combining level dependent hopping sequences that are common for all base stations, and base station specific scrambling sequences.

Embodiments of the invention are defined in the dependent claims. Other objects, advantages and novel features of the invention will become apparent from the following detailed description of the invention when considered in conjunction with the accompanying drawings and claims.

BRIEF DESCRIPTION OF THE DRAWINGS

The invention will now be described in detail with reference to the drawing figures, wherein FIG. 1a-c schematically illustrates the division of the available bandwidth into sub-bands according to the invention, and 1c illustrates a bandwidth assignment at a certain time;

FIG. 2a-c schematically illustrates the bandwidth assignment according to the invention at three different times;

FIG. 6a-c schematically illustrates different assignment cases and the resulting bandwidth allocation and frequency hopping in a system utilizing the method and arrangement according to the present invention.

DETAILED DESCRIPTION OF THE INVENTION

In a typical scenario wherein the present invention may be utilized, a plurality of entities, or radio nodes, share radio resources for wireless communication. The communication system may be of the cellular type and one radio node being a base station (BS) in communication with a plurality of mobile stations (MS), or user equipment (UE). Such system may also comprise mobile and fixed relay stations. Other systems also sharing radio resources include different kinds of ad hoc systems and multihop systems, wherein user equipment typically also acts as relay stations forwarding a message towards an end node. Such systems normally has much less order structure than the cellular system. In the following the method and arrangement according to the present invention will be exemplified in a cellular scenario. However, as appreciated by the skilled in the art the invention may, with only slight modifications, be applicable also other type of wireless communication systems wherein the radio resources are shared between a plurality of users.

As is well known in the art, functionalities regarding the control of the radio interface in wireless systems, are typically distributed to more than one node, and a centralized node, a radio network controller, RNC, typically has responsibility for assignment of carriers, handovers etc, whereas power control and similar high speed regulations are autonomously handled by the BS. In fact, the functions and actions can be controlled by the RNC, but governing the operation of a specific BS. In the following, for the reason of simplicity, when referring to functions and actions performed by the BS, it should be understood that these functions and actions may involve other nodes, or even be controlled by other nodes, in an radio access network, for example a RNC.

The method and arrangement according to the present invention address the problem of applying frequency hopping to systems wherein the bandwidth allocation must be continuous, or alternatively distributed but regular, as for interleaved frequency division multiple access, IFDMA. The term "continuous" is hereinafter meant to encompass both strictly continuous bandwidth allocation and distributed but regular allocation.

The method according to the invention provides a leveled splitting of the available bandwidth where each new level, n, splits a bandwidth portion at the preceding level into a number of new pieces. All possible combinations of bandwidth splitting may be represented by a hierarchical tree-like structure. The structure will hereinafter be referred to as a bandwidth tree. A branch going up to a certain level in the tree will then identify a carrier frequency with a specific branch and level dependent bandwidth. The splitting of the available bandwidth into a tree-like structure and the establishment of the bandwidth tree is typically performed in an system setup phase or at maintenance of the system. The bandwidth tree may be changed to accommodate for changing traffic demands, for example. The changes of the tree may be periodical or on demand. However, typically a bandwidth tree is not changed frequently during normal operation of a wireless system.

Above, and also in the following, the bandwidth splitting and the forming and utilisation of the bandwidth tree are for the sake of simplicity only, described as affecting an entire wireless system. As appreciated by the skilled in the art a system may comprise a plurality of different bandwidth trees, wherein one bandwidth tree is utilised in one part of the system (one group of basestations), and a different bandwidth tree is utilised in another part of the system (a second group of basestations).

In the process of constructing a bandwidth tree a total available bandwidth of B [Hz] is assumed, which is then also the maximum transmission bandwidth. The available bandwidth can be said to reside at level 0. On the level below, here level 1, M sub-bands of equal size are created by dividing the bandwidth B into M continuous sub-bands. Each of these sub-bands may then, in turn, be divided into several sub-bands with the only restriction that sub-bands with same parent (root) must be of the same size. The partitioning of the bandwidth continuous until the width of the sub-bands equals the minimum requested transmission bandwidth.

Figure 1A:
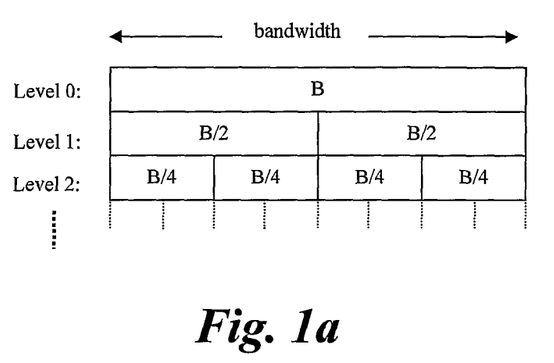

As an example, the bandwidth is split (in every step) into two equally sized parts. The outcome of such a binary splitting is schematically depicted in FIG. 1a, and a corresponding bandwidth tree in FIG. 1b. A leaf in the bandwidth tree represent resources corresponding to the bandwidth splitting at the same level as the level of the leaf. Resources can be assigned at any level and hence different transmission bandwidths can be obtained. Once the resource corresponding to a certain leaf in the tree is assigned to a user, all leafs below become unavailable to other users sharing resources from the same tree. Moreover, the parent leafs above can then neither be assigned to other users. An example of bandwidth assigned to three different users $U_1$, $U_2$ and $U_3$ is illustrated in FIG. 1c. $U_1$ is assigned half the available bandwidth and $U_2$ and $U_3$ ¼ each. This is illustrated by that $U_1$ is assigned leaf 115 on level 1, $U_2$ and $U_3$ leafs 120 and 125 on level 2, respectively. The leafs below leaf 115 are unavailable and so are all the leafs below leaf 120 and 125. Since resources below leaf 110 are occupied by user $U_2$ and $U_3$ leaf 110 cannot be assigned to any user.

Frequency hopping is according to the invention accomplished by using the bandwidth tree and a set of input sequences. The set of input sequences comprises of groups of input sequences, wherein each group is associated to a level in the bandwidth tree. Within a group the individual input sequences should be mutually dependent but between groups, i.e. input sequences associated to different levels, the input hopping sequences do not need to be mutually dependent Typical special cases of input sequences are constant (no hopping), cyclic (e.g. 010101 . . . ) and pseudo-random. The set of input sequences is distributed to all involved radio nodes. The distribution may preferably be made at the same time, and in the same manner as the distribution of the bandwidth tree. A frequency hopping sequences at a certain level is formed by a radio node by switching between the different branches at the specified level in a sequence at least partly based on the input sequence, or input sequence group, associated to that level.

Orthogonal hopping sequences are formed as branch switching with the constraint that a branch switching sequence at level n is determined by the branch switching sequence at level n−1 combined with an input sequence on the available new branches from level n−1 to n.

Figure 1B:
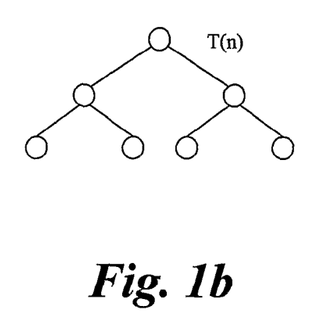
Figure 1C:
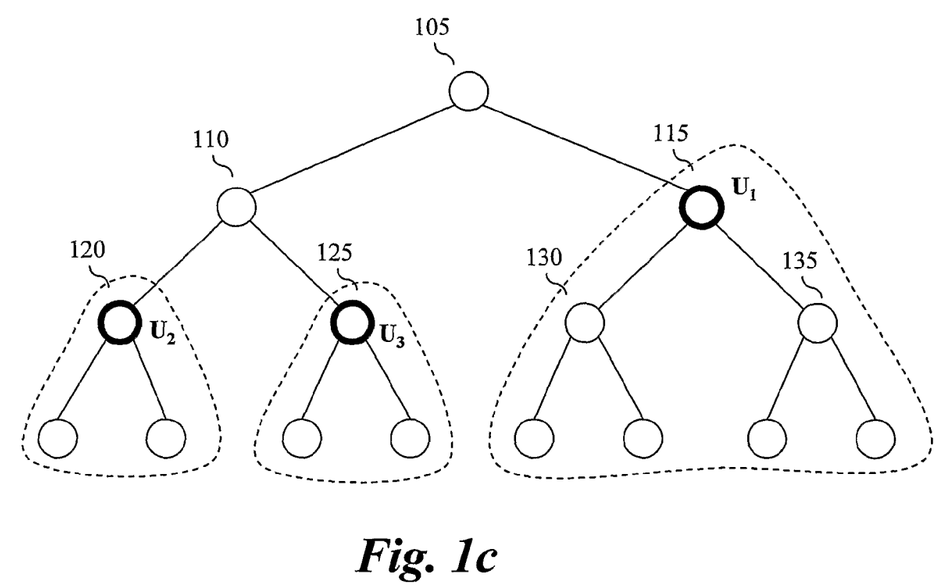
Figure 2A:
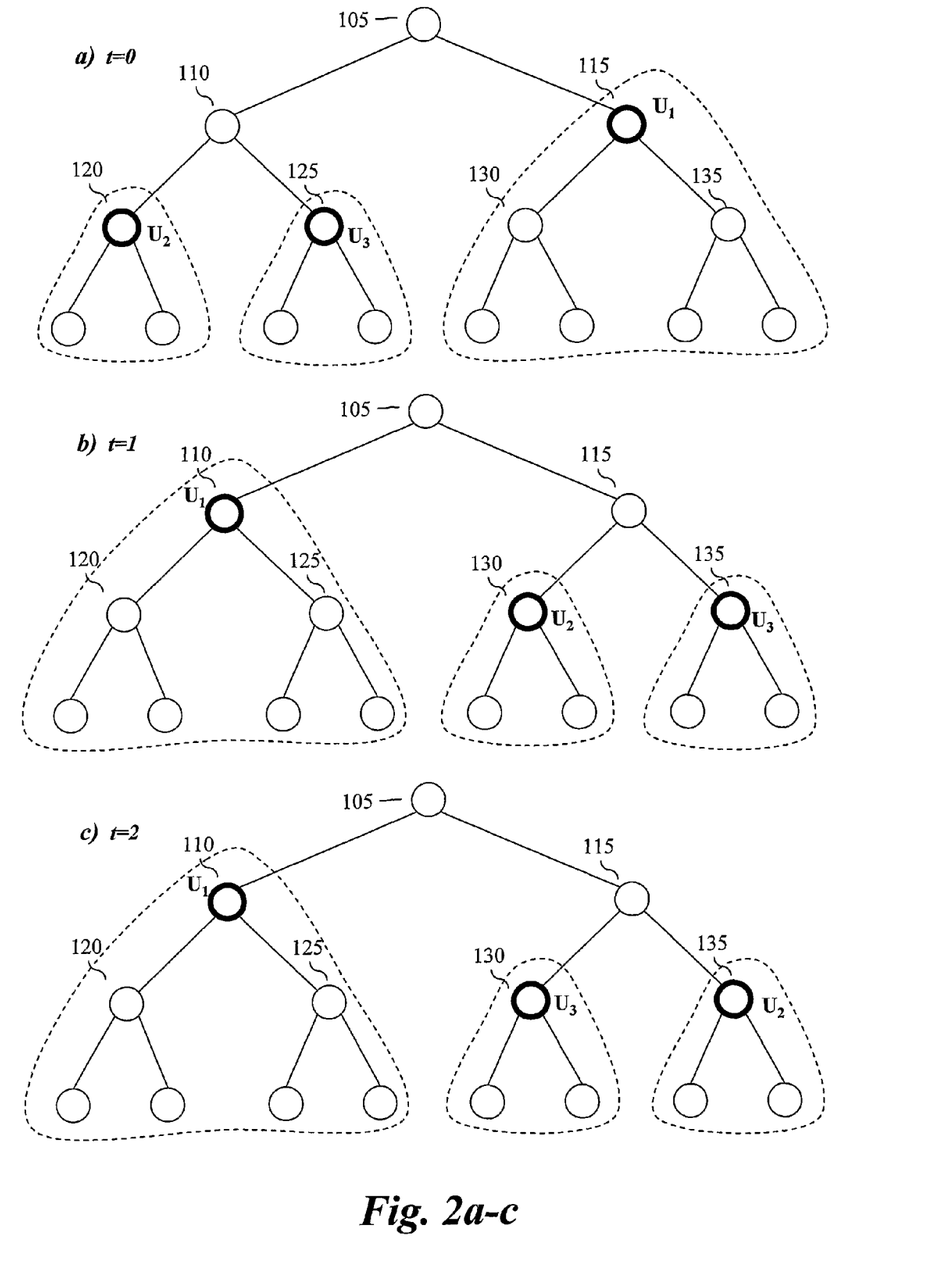

FIG. 2 a-d illustrates a possible frequency hopping in the case bandwidth has been assigned to the users as described in FIG. 1c, at time instances t=0, 1, 2, 3. The dashed areas illustrates the branch structure associated with each user. As seen, the structure remains unchanged, ensuring that the assigned continuous bandwidth is assured for each user, although which leafs, i.e. frequencies used, will change. This can also be described as that the relations between the leaf assigned to a user and all underlying leafs will be intact during the frequency hopping.

According to a preferred embodiment of the invention the assignment of bandwidth and the generation of hopping sequences for an user are performed using a hopping sequence tree. The hopping sequence tree is closely related to the bandwidth tree, and knowledge of the bandwidth tree is needed to construct the hopping sequence tree. The hopping sequences tree should be given the same tree structure as the bandwidth tree, i.e. same number of leafs (nodes), same number of levels, and same number of leafs on each level. This is reflecting the fact that the number of possible hopping sequences at one level is equivalent to the number of bandwidth resources at the corresponding level. Hence, if the bandwidth splitting, represented by the bandwidth tree has been communicated to the relevant radio nodes, the hopping sequence tree does not have to be communicated. Each level in the hopping sequence tree corresponds to a bandwidth splitting equivalent to the same level in the bandwidth tree. To each leaf in the hopping tree is associated an input sequences and a hopping sequence can be derived from the input sequences on all leafs on the branch leading from the root to that (said) leaf. Bandwidth is assigned to a user by assigning the user a leaf in the hopping sequence tree on the level corresponding to the bandwidth requirements. Following the constrain that a hopping sequence at level n is determined by the hopping sequence at level n−1, i.e. the adjacent level closer to the root of the hopping sequence tree, combined with the input sequence associated with the leaf, a hopping sequence associated with the leaf can be derived. The hopping sequence will give the assigned bandwidth, i.e. the position in the bandwidth tree at each time instance. Hence, the hopping sequence gives the branch switching in the bandwidth tree.

Figure 3A:
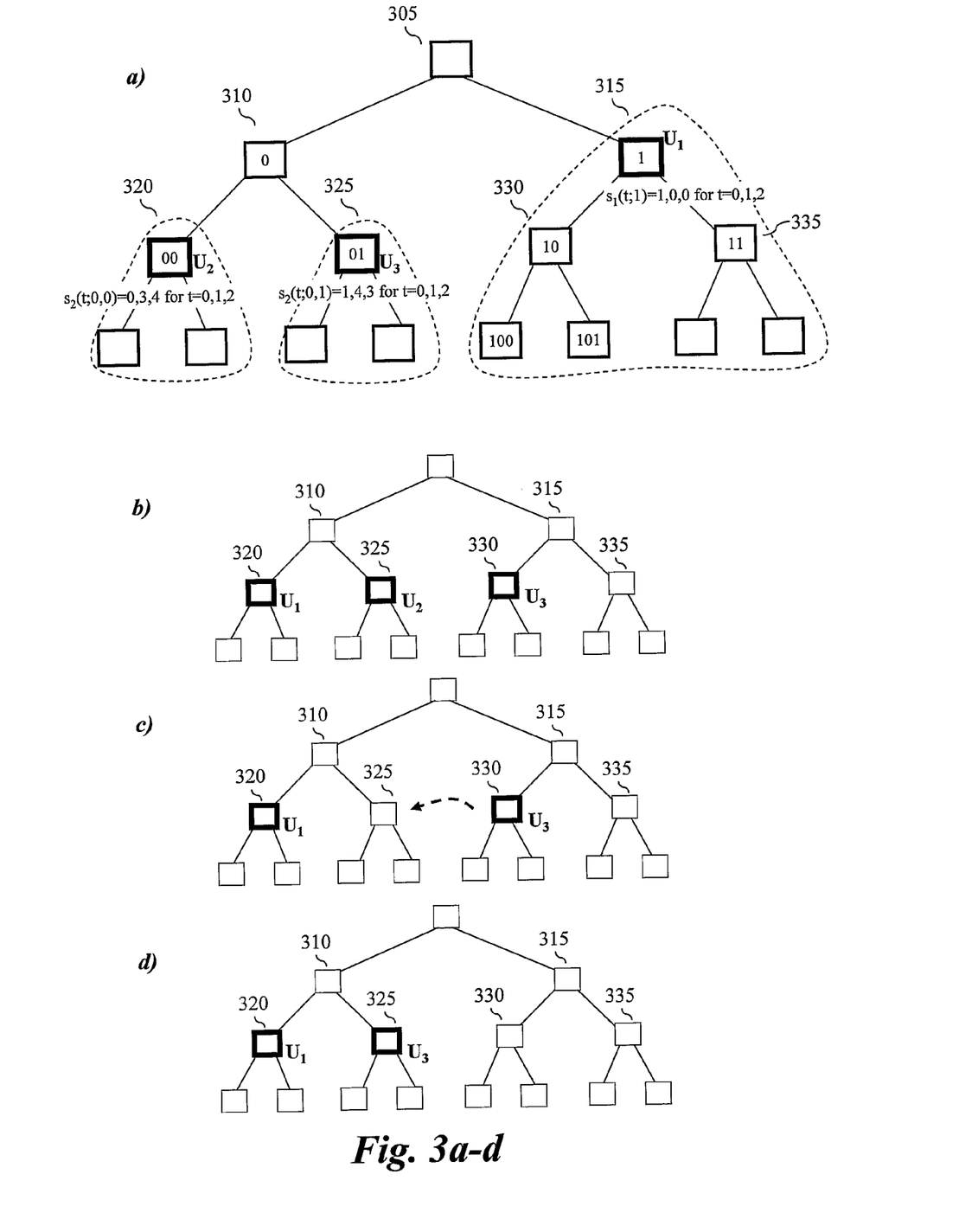
FIG. 3a schematically illustrates the assignment of bandwidth and frequency hopping sequences utilizing the hopping sequence tree according to the invention, and 3b-d illustrates different assignments.

In FIG. 3 is a hopping sequence tree associated with the bandwidth tree of FIG. 1 a-b illustrated. User $U_1$ is assigned half the available bandwidth and $U_2$ and $U_3$ ¼ each. This is illustrated by that $U_1$ is assigned leaf 315 on level 1, $U_2$ and $U_3$ leafs 320 and 325 on level 2, respectively. Examples of hopping sequences associated to the leafs, and which produce the frequency hopping illustrated in FIG. 2, are indicated in FIG. 3.

Interference diversity between base stations can be achieved by combining level dependent hopping sequences that are common for all base stations, and base station specific scrambling sequences.

Figure 4A:
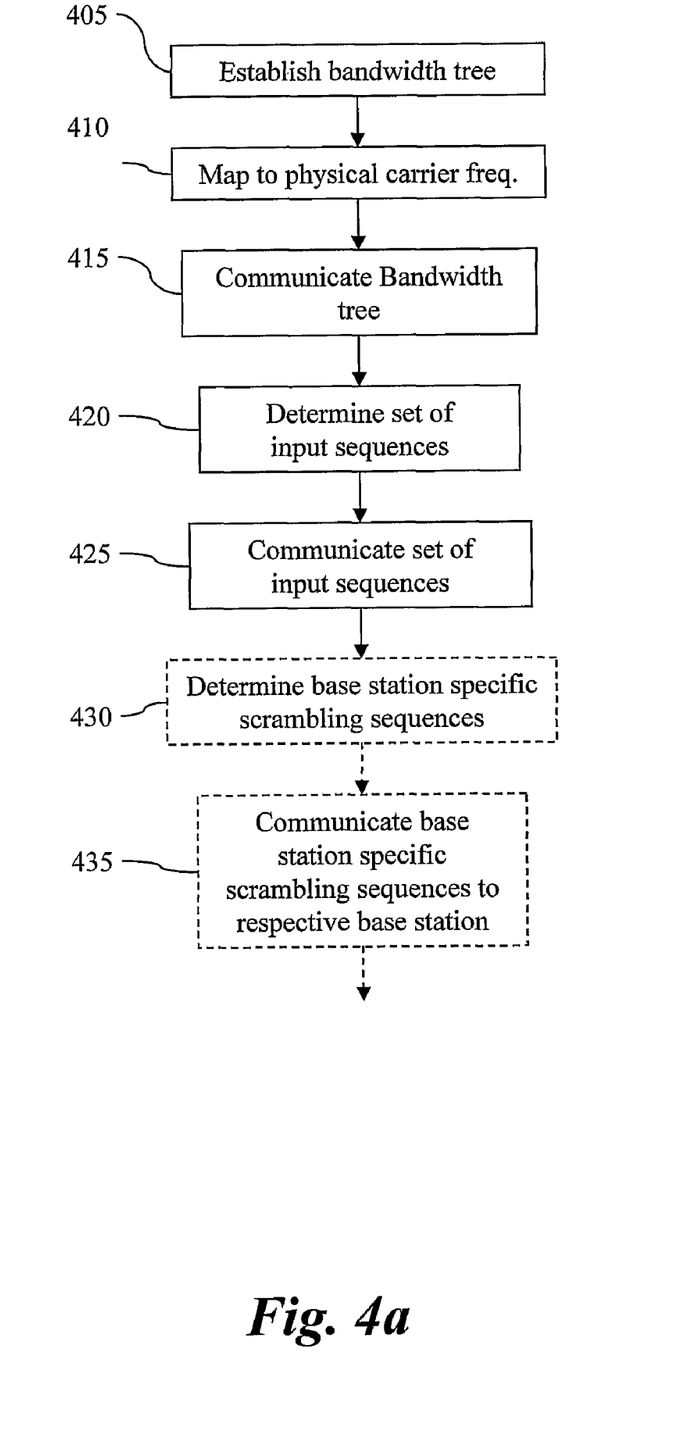
FIG. 4a-b are flowcharts over the method according to the present invention.
Figure 4B:
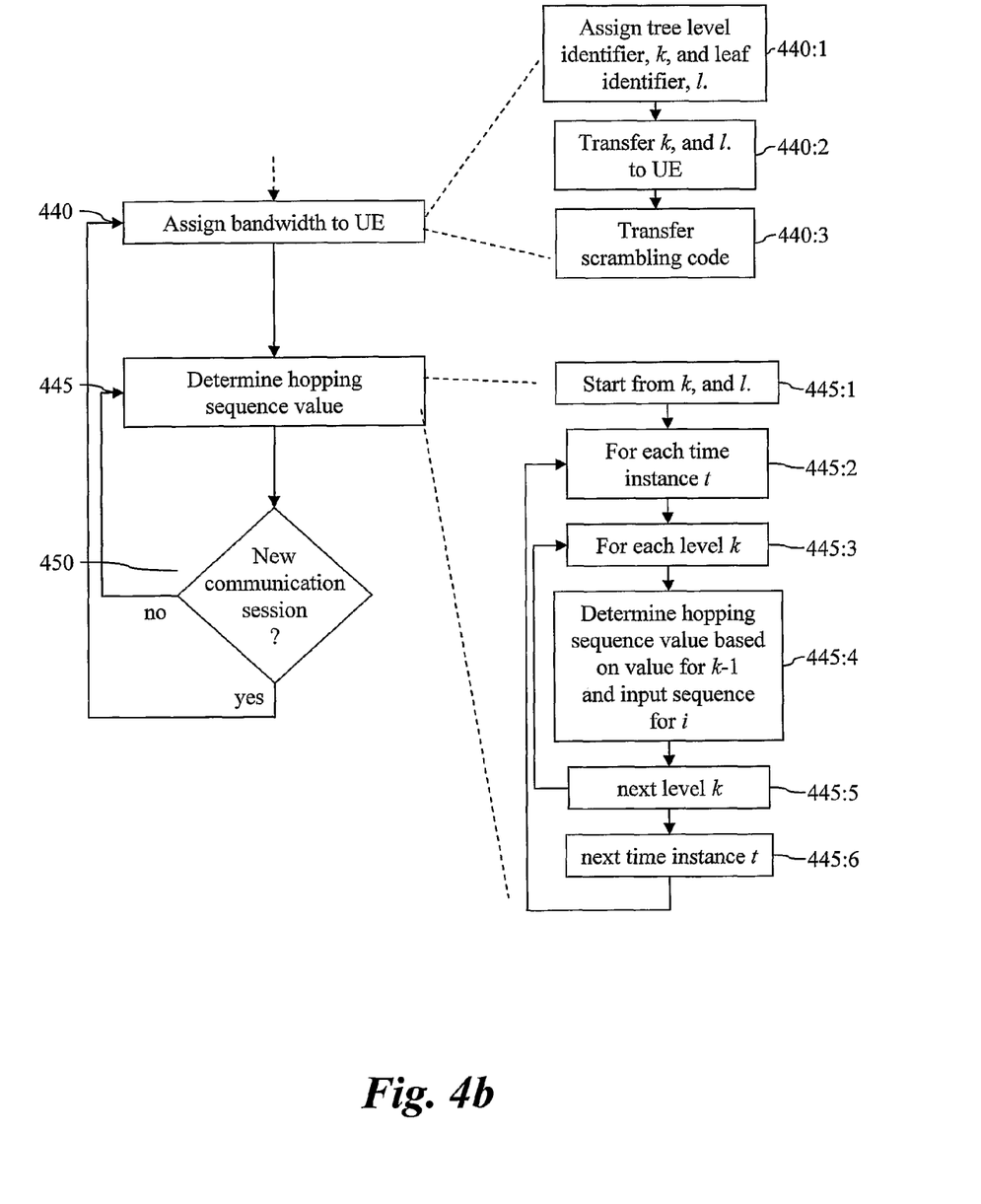

The method according to the invention comprises a system setup phase and an operation phase, which is illustrated in the flowchart of FIG. 4. The system setup phase comprises the steps of:

| | |
|---|---|
| 405: | Establish bandwidth tree by dividing the available bandwidth B into M continuous sub-bands. The sub-bands are in turn divided into several sub-bands with the only restriction that sub-bands with same parent must be of the same size. The partitioning of the bandwidth continuous until the width of the sub-bands equals an assumed minimum requested transmission bandwidth. Each splitting corresponds to a level in the tree and each state at a level is referred to as a leaf. In the establishment of the bandwidth tree anticipated traffic scenarios are preferably taken into account. |
| 410: | Mapping of the bandwidth tree to physical carrier frequencies. |
| 415: | Communicate the bandwidth tree and corresponding physical carrier frequencies to all radio nodes in the system or the part of the system in which the bandwidth tree is relevant. |
| 420: | Determine at least one set of input sequences to be used to derive hopping sequences. Each set of input sequences comprises a plurality of groups of input sequences, wherein each group is associated to a specific level in the bandwidth tree. In each group the input sequences should be mutually dependent. |
| 425: | Communicate the set of input sequences to radio nodes in the system or |

| | |
|---|---|
| | part of the system. |
| 430: | Optionally determining base station specific scrambling sequences, which in combination with the inputs sequences can form base station specific input sequences. |
| 435: | Optionally communicate the base station specific scrambling sequences to respective base stations. |

The establishment of the bandwidth tree and the set of input sequences is for example performed via a Operation and Maintenance node, O&M node, and distributed via Radio Network Controllers, RNCs, in the communication system.

The operating phase, comprising a communication (call) setup and a communication session, comprises the steps of:

| | |
|---|---|
| 440: | On communication setup a bandwidth is assigned to the UE and a frequency hopping scheme for the UE and BS to follow is determined. The assigned bandwidth is typically and preferably at least partly based on a bandwidth requirement from the UE. The UE has synchronized its frequency hopping clocking with the base station. It is assumed that the UE has been provided with the bandwidth tree and the relevant set of input sequences. The assignment comprises: |
| 440:1 | The BS determines frequency hopping parameters reflecting the assigned bandwidth tree, the hopping sequence tree, and a hopping sequence identifier. Using the hopping sequence tree, assigning a position in the tree suffice for assigning bandwidth and hopping sequence. A preferred way is in the form of a (hopping sequence) tree level identifier, k, and a leaf identifier, l. The starting position in the bandwidth tree is given by the time, t, of the frequency hopping clock, and the assigned hopping sequence. |
| 440:2 | The frequency hopping parameters, preferably the hopping sequence tree level identifier, k and leaf identifier, l, are transferred from the base station to the UE. |
| 440:3 | Optionally a base station specific scrambling sequence is transferred to the UE. |
| 445: | Both the UE and the base station determine for each time instance a hopping sequence value. The hopping sequence value represents a position, or leaf, in the bandwidth tree, and is determined by the hopping sequence associated with the assigned leaf in the hopping sequence tree. Following the above describe constrains about how the hopping sequences are derived from the input sequences, the hopping sequence value at one level, n, is dependent on the hopping sequence value associated to the same branch structure on the adjacent level closer to the root of the tree, n − 1, and an input sequence for the level n. Hence, hopping sequence values associated to a communication session is determined by a recursive process ensuring orthogonality as compared to other communication sessions maintained by the same base station. |
| 450: | The determined hopping sequence is used throughout the communication session. |

The hopping sequence value in step 445 may be determined for a coming time instance at the time. Alternatively, a frequency hopping scheme, for example representing a full repetition cycle, can be determined during the communication setup phase. As an alternative, the process of determining the frequency hopping scheme, step 445, may be performed in only one of the involved radio nodes, preferably the base station or a to the base station associated control node (the RNC), and the scheme communicated to the other node, the UE.

The bandwidth requirements may vary during a communication session. The change in requirement may be due to a change of service during the session, for example starting a download, or switching from a voice to video call. Changes can also be necessary due to variations in the radio environment—the system may not be able to withhold a large bandwidth in for example a overload situation. The method according to the invention can easily be adapted to cater also for bandwidth changes during a communication session, by re-assigning bandwidth to the user, or users, using the assignment process, steps 440-450, described above.

The BS may identify that the allocation of positions in the hopping sequence tree is non optimal. If, for example, an user is assigned a leaf in a part of the hopping sequence tree that is sparsely assigned, it might be advantageous to re-assigned that user to a more densely assigned part, in order for the BS to be able to accept a communication session requiring more bandwidth. The assignment process, steps 440-450, can be used also for this re-assignment. The process is schematically illustrated in FIG. 3b-d, wherein in b) three users $U_1$, $U_2$ and $U_3$ are assigned to leafs 320, 325, and 330 on level 2, respectively. In this situation the BS can accept one further user on level 2. If for example, c) the communication session associated with user $U_2$ ends, the BS can accept two sessions, but still only with a maximum required bandwidth corresponding to level 2. By re-assigning user $U_3$ to leaf 325, the BS is ready to accept sessions also with higher bandwidth requirements, i.e. bandwidth corresponding to level 1. Hence, by utilising the assignment process according to the invention to re-assign users in the hopping sequence tree, higher flexibility is achieved. An optimisation principle is to strive to assign users as close together in the hopping sequence tree as possible. It should be noted that this does not lead to a reduced hopping sequence spreading.

An example of implementing the method according to the invention, representing a preferred embodiment of the invention, will be given below. It is assumed that a bandwidth tree with n+1 levels in accordance with FIG. 1, and the set of input sequences are known to the involved radio nodes (corresponding to the system setup phase 415-430). The bandwidth splitting is binary and hence the bandwidth tree and the corresponding hopping sequence tree are binary trees. Further, the hopping sequence tree level identifier, k and leaf identifier, l, have been transferred to the UE, so that both the base station and the UE have the sufficient information to determine the hopping sequence values for each time instance.

The step of determining the hopping sequence 445, comprises in this embodiment the substeps of:

| | |
|---|---|
| 445:1 | Let the leaf at level $k \leq n$ in the hopping sequence tree, where n is the highest level of the corresponding bandwidth tree, be specified by the vector $(x_1, x_2, \ldots, x_k)$ in which $x_i$ denotes the branch selected at level i. For the binary tree, $x_i$ is 0 or 1. For each leaf $(x_1, x_2, \ldots, x_i)$ at each level i is associated a hopping sequence $s_i(t; x_1, x_2, \ldots, x_i)$ taking values in $\{0, 1, \ldots, 2^i - 1\}$; |

-continued

445: 2, 6   where a time index, i.e. the time of frequency hopping clock,
t = 0, 1, 2, . . . is stepped for each hop in the sequence.
445: 3, 5   For a connection using leaf $(x_1, \ldots, x_k)$ at level k in the hopping
sequence tree, the hopping sequence value at time t is determined by:
445: 3-4   (1) $s_k(t; x_1, x_2, \ldots, x_k) = s_{k-1}(t; x_1, x_2, \ldots, x_{k-1}) \cdot 2 + a_k(t; x_1, x_2, \ldots, x_k)$,
where
$s_0(t) = 0$ for all t,
and $a_i(t; x_1, x_2, \ldots, 0)$, i = 1, 2, . . . , n, are input sequences (e.g. pseudo-random) such that $a_i(t; x_1, x_2, \ldots, 1) = a_i(t; x_1, x_2, \ldots, 0) \oplus 1$ in which
$a \oplus b := (a + b)$ mod 2. A special case is that $a_i(t; x_1, x_2, \ldots, 0) = a_1(t; 0)$
for each level i and branch $(x_1, x_2, \ldots, x_{i-1})$, where $a_1(t; 0)$,
t = 0, 1, 2, . . . , is a given binary sequence.

In order to construct a full hopping sequence for a connection, the terminal must have knowledge about the input sequences $a_i(t; x_1, x_2, \ldots, 0)$ used by the base station (at most $2^{n-1}$ different sequences for a binary tree with n+1 levels).

Note that equation (1) specifies a hopping sequence for a specific bandwidth corresponding to the level in the hopping sequence tree. This is mapped to the physical frequencies by associating the hopping sequence value at a time t to the corresponding position in the associated bandwidth tree, in which the bandwidth allocations are specified.

For example, in a binary tree with n+1 levels (i.e. minimal bandwidth $B/2^n$), a hopping sequence generated for a terminal on level k will on the finest frequency scale (i.e. at level n) be given by $$s_i(t; x_1, x_2, \ldots, x_i) \cdot 2^{n-i}. \quad (2)$$

As discussed previously the method according to the invention provides for obtaining interference diversity between users connected to different base stations operating on the same frequency band, the basic input sequences $$a_i(t; x_1, x_2, \ldots, 0), t=0,1,2, \ldots, i=1,2, \ldots, n, x_i=0,1,$$

should differ between base stations. However, the complexity to distribute and manage a large number of input sequences should be regarded. An effective way to achieve frequency diversity without significantly increasing the complexity and signalling is to construct base station specific input sequences according to $$a_i^{(b)}(t; x_1, x_2, \ldots, 0) = a_i^{(0)}(t; x_1, x_2, \ldots, 0) \oplus r^{(b)}(t) \quad (3)$$

Where $a_i^{(0)}(t; x_1, x_2, \ldots, 0)$ are input sequences used by all base stations, and $r^{(b)}(t)$ is a binary scrambling sequence (pseudo-random) that is specific for a particular base station. The scrambling sequence identity, identifying the binary scrambling sequence used by a base station is signalled to the terminal at communication set-up.

Figure 5A:
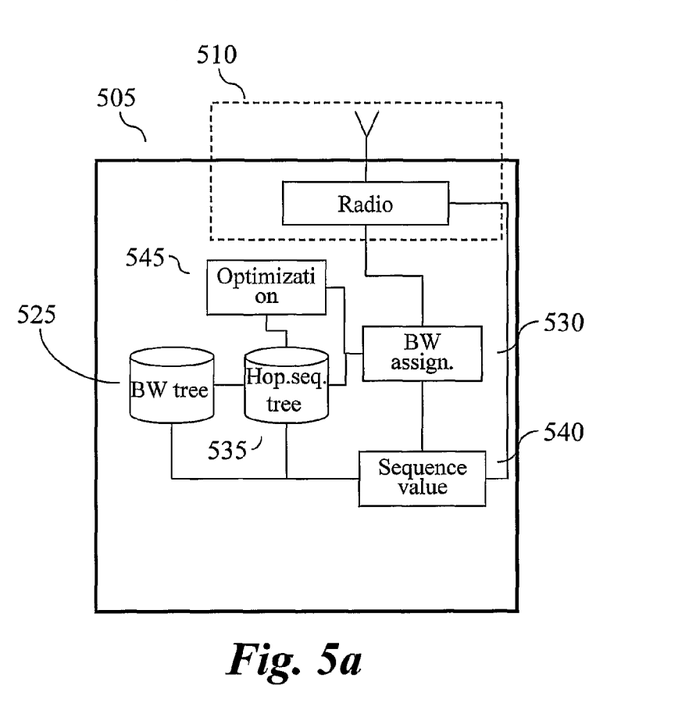
FIGS. 5a and b schematically illustrates a sending and a receiving node according to the present invention.
Figure 5B:
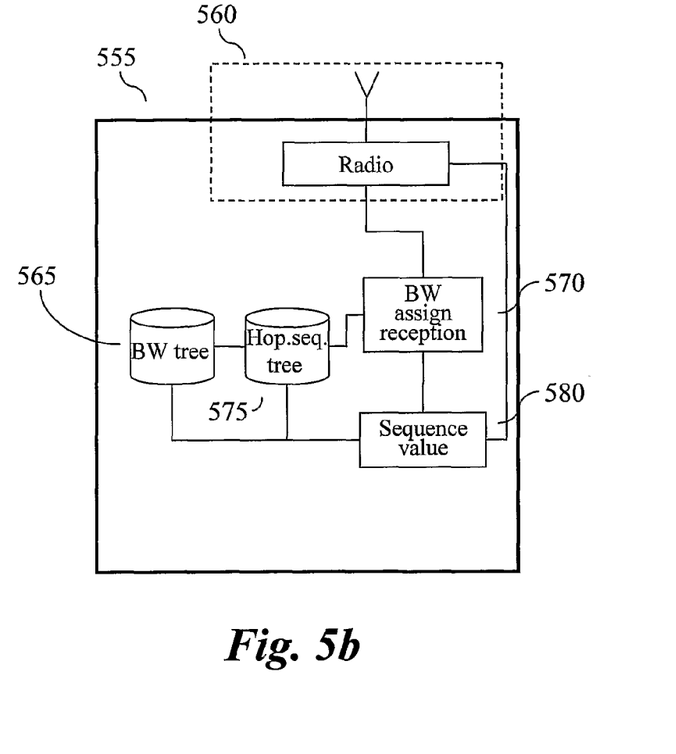

Arrangements according to the present invention in a radio base station and user equipment, respectively, suitable for effectuating the above described embodiments are schematically illustrated in FIGS. 5a and 5b. The modules and blocks according to the present invention are to be regarded as functional parts of a base station and/or an user equipment in a communication system, and not necessarily as physical objects by themselves. The modules and blocks are preferably at least partly implemented as software code means, to be adapted to effectuate the method according to the invention. The term "comprising" does primarily refer to a logical structure and the term "connected" should here be interpreted as links between functional parts and not necessarily physical connections. However, depending on the chosen implementation, certain modules may be realized as physically distinctive objects in a receiving or sending node.

The base station 505 comprises radio communication means 510, which provides the necessary functionalities for performing the actual reception and transmission of radio signals and is well known by the skilled person. According to the invention the base station 505 is provided with a bandwidth tree storage 525, arranged to receive and store a representation of the bandwidth tree and representations of input sequences. Depending on the implementation this information is permanently stored in the bandwidth tree storage, or can be altered during system maintenance, for example. The bandwidth tree and the input sequences are common for all nodes in the system. A hopping sequence tree storage 535, which is in connection with the bandwidth tree storage 525 stores a representation of a hopping sequence tree which is closely associated with the bandwidth tree, and hopping sequences associated to leafs in the hopping sequence tree. The information stored in the hopping sequence tree storage 535 is local and used only by the base station 505. A bandwidth assignment module 530 is in connection with the radio communication means and the hopping sequences tree storage 535. The bandwidth assignment module 530 is adapted to assign and communicate a bandwidth to a user by the use of information retrieved from the hopping sequence tree storage 535. The bandwidth assignment module 530 is connected to, and provides, a hopping sequence value module 540, with information of the assigned bandwidth, preferably a position in the hopping sequence tree. The hopping sequence value module 540 is arranged to determine a hopping sequence value for each time instance using the input sequences and the hopping sequence tree, and to output an instruction of which frequency to use for the coming transmission/reception, the hopping sequence value, to the radio communication means 510. Hence, the hopping sequence value module 540 is in connection to the bandwidth tree storage 525, the hopping sequence tree storage 535 and the radio communication means 510. Optionally the base station 505 may comprise an optimization module 545, in connection to the bandwidth assignment module 530 and the hopping sequences tree storage 535, and adapted to monitor the status of the hopping sequence tree and to suggest re-assignments to the bandwidth assignment module 530.

The user equipment 555 comprises radio communication means 560, which provides the necessary functionalities for performing the actual reception and transmission of radio signals and is well known by the skilled person. According to the invention the base station 555 is provided with a bandwidth tree storage 565, arranged to receive and store a representation of the bandwidth tree and representations of input sequences. Depending on the implementation this information is permanently stored in the bandwidth tree storage, or can be altered/updated via common means for updating mobile equipment. A hopping sequence tree storage 575, which is in connection with the bandwidth tree storage 565 stores a representation of a hopping sequence tree which is closely associated with the bandwidth tree, and hopping sequences associated to leafs in the hopping sequence tree. The information stored in the hopping sequence tree storage 575 is local and used only by the user equipment 505. An assignment reception module 570 is in connection with the radio communication means and the hopping sequences tree storage 575. The assignment reception module 570 is adapted to receive a representation of an assigned bandwidth from a base station. The assignment reception module 570 is connected to, and provides, a UE hopping sequence value module 580, with information of the assigned bandwidth, preferably a position in the hopping sequence tree. The UE hopping sequence value module 580 is arranged to determine a hopping sequence value for each time instance using the input sequences and the hopping sequence tree, and to output an instruction of which frequency to use for the coming transmission/reception, the hopping sequence value, to the radio communication means 560. Hence, the hopping sequence value module 580 is in connection to the bandwidth tree storage 565, the hopping sequence tree storage 575 and the radio communication means 560. The user equipment may for example be a mobile station, a laptop computer, a PDA, a camera, a video/audio player or a game pad provided with radio communication abilities. Other examples include, but is not limited to machinery provided with radio communication abilities, such as vehicles or a stationary machines such as automatic vending machines.

Figure 6A:
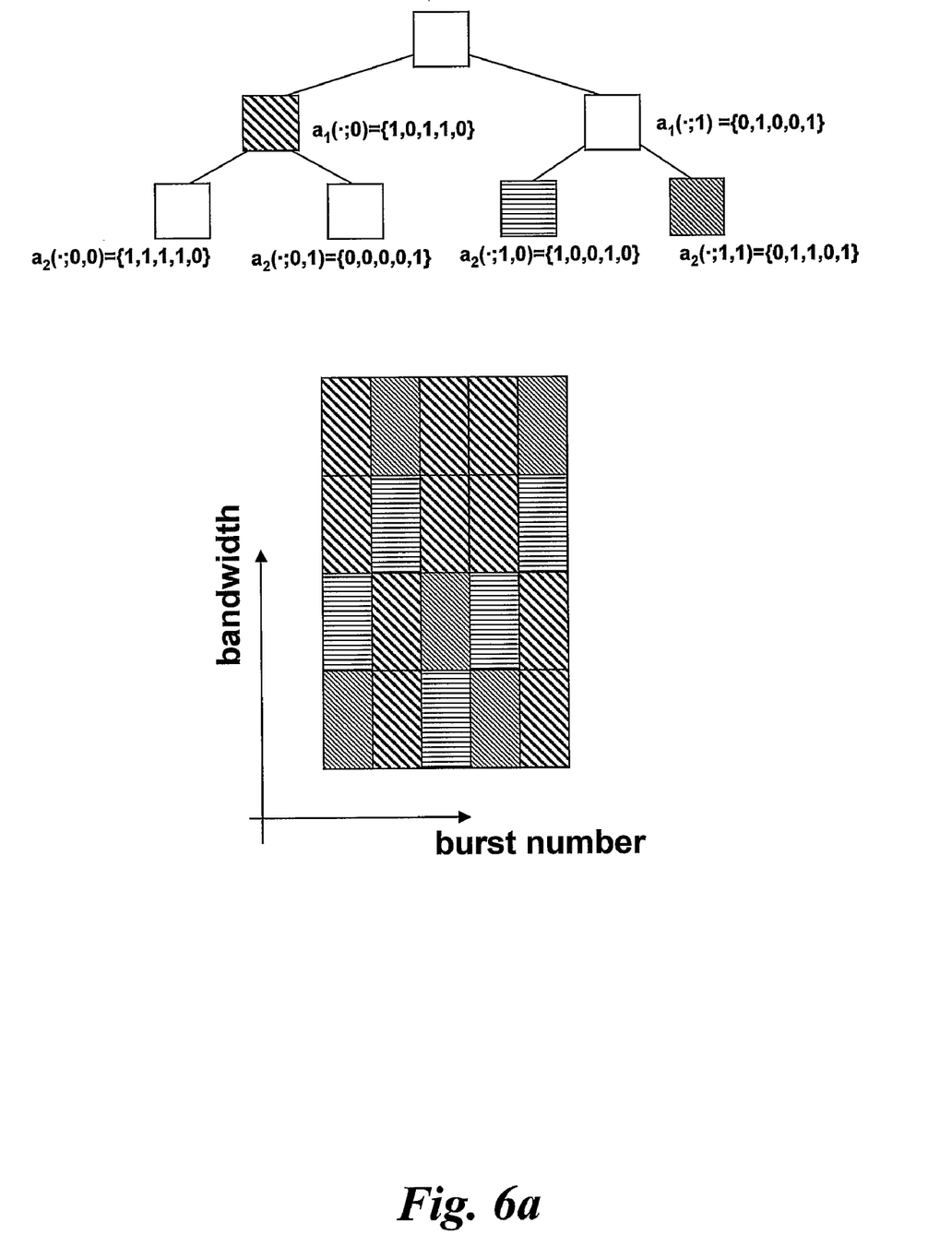
Figure 6B:
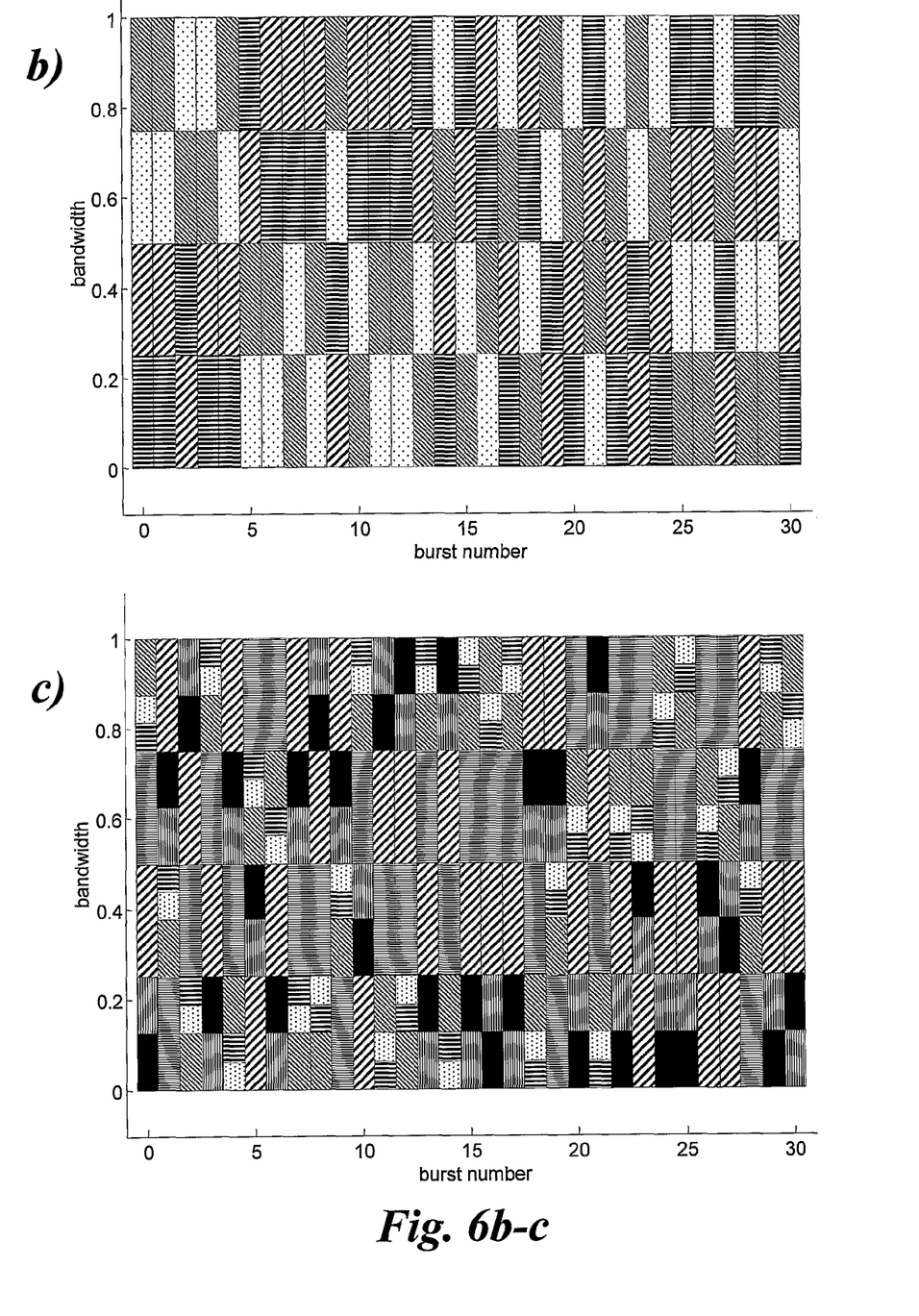

Different hopping schemes produced by the method and arrangement according to the present invention, are schematically illustrated in FIG. 6a-c. In a) 3 users are assigned to the hopping sequences tree with assigned bandwidths ½, ¼, and ¼, respectively; in b) 4 users are allocated ½, ¼, ⅛, and ⅛ of the bandwidth, respectively; and in c) 7 users are allocated ¼, ¼, ⅛, ⅛, ⅛, ¹⁄₁₆ and ¹⁄₁₆ of the bandwidth, respectively.

The method according to the present invention is preferably implemented by means of program products or program module products comprising the software code means for performing the steps of the method. The program products are preferably executed on a plurality of entities within a network. The program is distributed and loaded from a computer usable medium, such as a floppy disc, a CD, or transmitted over the air, or downloaded from Internet, for example.

While the invention has been described in connection with what is presently considered to be the most practical and preferred embodiments, it is to be understood that the invention is not to be limited to the disclosed embodiments, on the contrary, is intended to cover various modifications and equivalent arrangements within the appended claims.

The invention claimed is:

1. A frequency hopping method adapted for use in single carrier variable bandwidth wireless communication systems, during communication between at least a first radio node and a second radio node, wherein a continuous part of the available frequency spectrum is assigned for the communication, said first radio node and second radio node establishing or maintaining a communication session, the method comprising:

establishing a bandwidth tree by dividing the available bandwidth, associated with the available frequency spectrum in a leveled structure, wherein the available bandwidth at each new level, n, splits a bandwidth portion at the preceding level into a plurality of new pieces, whereby all possible combinations of bandwidth splitting forms a hierarchical tree-like structure, hereinafter referred to as the bandwidth tree, and a branch going to a certain level in the tree identifies a carrier frequency with a specific level dependent bandwidth, and mapping the bandwidth tree to physical carrier frequencies;

assigning a bandwidth to the communication session by determining a position in a hopping sequences tree, said hopping sequence tree having the same tree structure as the bandwidth tree, and wherein each leaf represent a hopping sequence; and performing frequency hopping by determining a hopping sequences value, representing a position in the bandwidth tree, for each time instance based on the position in the hopping sequence tree, wherein the hopping sequence value at the level n, is dependent on the hopping sequence value associated to the same branch structure on the adjacent level closer to the root of the hopping sequence tree, n−1, and an input sequence associated with the level n.

2. The frequency hopping method according to claim 1, wherein the hopping sequences at a certain level is further depended on an input sequence from a group of input sequences associated to the certain level of the bandwidth tree.

3. The frequency hopping method according to claim 2, wherein the method comprises the steps, to be performed in a setup phase, of:

distributing the bandwidth tree and corresponding physical carrier frequencies to a plurality of radio nodes in the system;

determining at least one set of input sequences, wherein each set of input sequences comprises a plurality of groups of input sequences, and each group is associated to a specific level in the bandwidth tree; and distributing the set of input sequences to the plurality of radio nodes, and wherein the step of establishing comprises dividing the available bandwidth B into M continuous sub-bands, and in turn dividing the sub-bands into several sub-bands with the restriction that sub-bands with same parent must be of the same size.

4. The frequency hopping method according to claim 3, wherein the radio nodes have previously been provided with a representation of the bandwidth tree and the set of input sequences.

5. The frequency hopping method according to claim 3, wherein the communication system comprises a plurality of base stations, further comprising the steps, to be performed in a setup phase, of:

determining base station specific scrambling sequences, which in combination with the inputs sequences can form base station specific input sequences; and distributing the base station specific scrambling sequences to respective base stations.

6. The frequency hopping method according to claim 3, wherein the first radio node is a base station, and the second radio node is an user equipment, the method further comprising the step, to be performed in a operation phase, of transferring the position in the hopping sequences tree from the base station to the user equipment.

7. The frequency hopping method according to claim 6, wherein the step of assigning comprises specifying a tree level identifier, k, specifying a bandwidth and a leaf identifier, l, indicating a leaf in the hopping sequence tree on level k; and the step of transferring comprises transferring the tree level identifier, k and leaf identifier, l, from the base station to the user equipment.

8. The frequency hopping method according to claim 7, further comprising a step of the base station transferring a base station specific scrambling sequence to the user equipment; and in the step of determining hopping sequence values the scrambling sequence is used to modify the input sequence or input sequences.

9. The frequency hopping method according to claim 7, wherein in the step of determining hopping sequence values the hopping sequence value at time t is obtained from the recursion $$s_k(t;x_1,x_2,5,x_k)=s_{k-1}(t;x_1,x_2,5,x_{k-1})\cdot 2+a_k(t;x_1,x_2,5,x_k)$$

k=1, 2, 5, n, wherein the leaf at level k≦n is specified by the vector $(x_1, x_n, 5, x_k)$ in which $x_i$ denotes the assigned branch at level i, and to each level i is associated a hopping sequence $s_i(t; x_1, x_2, 5, x_i)$ taking values in $\{0, 1, 5, 2^i-1\}$, a time index t=0, 1, 2, 5 is stepped for each hop in the sequence, $a_i(t; x_1, x_2, 5, 0)$ is a input sequence from the set of input sequences, and $a_i(t; x_1, x_2, 5, 1)=a_i(t; x_1, x_2, 5, 0)\oplus 1$ in which a⊕b:=(a+b) mod 2.

10. The frequency hopping method according to claim 9, wherein in the step of modifying a input sequence the input sequence $a_i(t; x_1, x_2, 5, 0)$ is modified according to $a_i^{(b)}(t; x_1, x_2, 5, 0)=a_i^{(0)}(t; x_1, x_2, 5, 0)\oplus r^{(b)}(t)$ wherein $a_i^{(0)}(t; x_1, x_2, 5, 0)$ is the input sequences used by all base stations, and $r^{(b)}(t)$ is the base station specific scrambling sequence.

11. A Frequency hopping method in a radio base station in a single carrier variable bandwidth wireless communication system, wherein said base station and an user equipment are establishing or maintaining a communication session, the method comprising the available bandwidth, associated with the available frequency spectrum, has been divided in a leveled structure, wherein the available bandwidth at each new level, n, splits a bandwidth portion at the preceding level into a plurality of new pieces, whereby all possible combinations of bandwidth splitting forms a hierarchical tree-like structure, hereinafter referred to as the bandwidth tree and a branch going up to a certain level in the tree identifies a carrier frequency with a specific level dependent bandwidth; and by the steps of:

assigning a bandwidth to the communication session by determining a position in a hopping sequences tree, said hopping sequence tree having the same tree structure as the bandwidth tree, and wherein each leaf represent a hopping sequence; and performing frequency hopping by determining a hopping sequences value, representing a position in the bandwidth tree, for each time instance based on the position in the hopping sequence tree, wherein the hopping sequence value at the level n, is dependent on the hopping sequence value associated to the same branch structure on the adjacent level closer to the root of the hopping sequence tree, n−1, and an input sequence associated with the level n.

12. The frequency hopping method according to claim 11, wherein a base station specific scrambling sequences has been assigned to the base station.

13. The frequency hopping method according to claim 11, wherein the method further comprising the steps of:

transferring the position in the hopping sequences tree from the base station to the user equipment.

14. The frequency hopping method according to claim 13, wherein the step of assigning comprises specifying a tree level identifier, k, specifying a bandwidth and a leaf identifier, l, indicating a leaf in the hopping sequence tree on level k; and the step of transferring comprises transferring the tree level identifier, k and leaf identifier, l, from the base station to the user equipment.

15. The frequency hopping method according to claim 13, further comprising a step of the base station transferring a base station specific scrambling sequence to the user equipment; and in the step of determining hopping sequence values the scrambling sequence is used to modify the input sequence or input sequences.

16. The frequency hopping method according to claim 14, wherein in the step of determining hopping sequence values the hopping sequence value at time t is obtained from the recursion $s_k(t; x_1, x_2, 5, x_k)=s_{k-1}(t; x_1, x_2, 5, x_{k-1})\cdot 2+a_k(t; x_1, x_2, 5, x_k)$ k=1, 2, 5, n, wherein the leaf at level k≦n is specified by the vector $(x_1, x_2, 5, x_k)$ in which $x_i$ denotes the assigned branch at level i, and to each level i is associated a hopping sequence $s_i(t; x_1, x_2, 5, x_i)$ taking values in $\{0, 1, 5, 2^i-1\}$, a time index t=0, 1, 2, 5 is stepped for each hop in the sequence, $a_i(t; x_1, x_2, 5, 0)$ is a input sequence from the set of input sequences, and $a_i(t; x_1, x_2, 5, 1)=a_i(t; x_1, x_2, 5, 0)\oplus 1$ in which a⊕b:=(a+b)mod 2.

17. The frequency hopping method according to claim 16, wherein in the step of modifying a input sequence the input sequence $a_i(t; x_1, x_2, 5, 0)$ is modified according to $a_i^{(b)}(t; x_1, x_2, 5, 0)=a_i^{(0)}(t; x_1, x_2, 5, 0)\oplus r^{(b)}(t)$ wherein $a_i^{(0)}(t; x_1, x_2, 5, 0)$ is the input sequences used by all base stations, and $r^{(b)}(t)$ is the base station specific scrambling sequence.

18. A Frequency hopping method in an user equipment in a in a single carrier variable bandwidth wireless communication system, wherein said user equipment and a base station are establishing or maintaining a communication session, the method comprising the available bandwidth, associated to the available frequency spectrum, has been divided in a leveled structure, wherein the available bandwidth at each new level, n, splits a bandwidth portion at the preceding level into a plurality of new pieces, whereby all possible combinations of bandwidth splitting forms a hierarchical tree-like structure, hereinafter referred to as the bandwidth tree and a branch going to a certain level in the tree identifies a carrier frequency with a specific level dependent bandwidth; and by the steps of:

receiving a bandwidth assignment from the base station specifying a position in a hopping sequences tree, said hopping sequence tree having the same tree structure as the bandwidth tree, and wherein each leaf represent a hopping sequence;

performing frequency hopping by determining hopping a sequences value, representing a position in the bandwidth tree, for each time instance, based on the position in the hopping sequence tree, wherein the hopping sequence value at the level n, is dependent on the hopping sequence value associated to the same branch structure on the adjacent level closer to the root of the hopping sequence tree, n−1, and an input sequence associated with the level n.

19. The frequency hopping method according to claim 18, wherein the bandwidth assignment comprises a tree level identifier, k, specifying a bandwidth and a leaf identifier, l, indicating a leaf in the hopping sequence tree on level k.

20. The frequency hopping method according to claim 19, wherein in the step of determining hopping sequence values the hopping sequence value at time t is obtained from the recursion $s_k(t; x_1, x_2, 5, x_k)=s_{k-1}(t; x_1, x_2, 5, x_{k-1})\cdot 2+a_k(t; x_1, x_2, 5, x_k)$ k=1, 2, 5, n, wherein the leaf at level k≦n is specified by the vector $(x_1, x_2, 5, x_k)$ in which $x_i$ denotes the assigned branch at level i, and to each level i is associated a hopping sequence $s_i(t; x_1, x_2, 5, x_i)$ taking values in $\{0, 1, 5, 2^i-1\}$, a time index t=0, 1, 2, 5 is stepped for each hop in the sequence, $a_i(t; x_1, x_2, 5, 0)$ is a input sequence from the set of input sequences, and $a_i(t; x_1, x_2, 5, 1) = a_i(t; x_1, x_2, 5, 0) \oplus 1$ in which $a \oplus b := (a+b) \bmod 2$.

21. The frequency hopping method according to claim 20, wherein in the step of modifying a input sequence the input sequence $a_i(t; x_1, x_2, 5, 0)$ is modified according $a_i^{(b)}(t; x_1, x_2, 5, 0) = a_i^{(b)}(t; x_1, x_2, 5, 0) \oplus r^{(b)}(t)$ wherein $a_i^{(0)}(t; x_1, x_2, 5, 0)$ is the input sequences used by all base stations, and $r^{(b)}(t)$ is the base station specific scrambling sequence which has been provided to the user equipment from the base station.

22. A radio base station adapted for use in a single carrier variable bandwidth communication system, wherein the base station is adapted for communication with at least one user equipment, and a continuous part of the available frequency spectrum is assigned for the communication, the base station comprising radio communication means and further comprising:
   a bandwidth tree storage, adapted to receive and store a representation of a bandwidth tree and representations of input sequences;
   a hopping sequence tree storage, which is in connection with the bandwidth tree storage and adapted to store a representation of a hopping sequence tree which is closely associated with the bandwidth tree, and hopping sequences associated to leafs in the hopping sequence tree; and
   a hopping sequence value module, in connection with the hopping sequence tree storage and with the radio communication means and adapted to determine a hopping sequence value for each time instance of the communication session using information retrieved from the hopping sequence tree storage, and to output an instruction based on the hopping sequence value of which frequency to use for the coming transmission/reception to the radio communication means.

23. The base station according to claim 22, further comprising a bandwidth assignment module which is in connection with the radio communication means, the hopping sequences tree storage and the hopping sequence value module, said bandwidth assignment module adapted to assign and communicate a bandwidth assignment to a user by the use of information retrieved from the hopping sequence tree storage, and to provide the hopping sequence value module with information of the assigned bandwidth, preferably in the form of a position in the hopping sequence tree.

24. The base station according to claim 23, further comprising an optimization module, in connection to the bandwidth assignment module (530) and the hopping sequences tree storage, and adapted to monitor the status of the hopping sequence tree and to suggest re-assignments to the bandwidth assignment module.

25. The base station according to claim 23, wherein the hopping sequence value module is adapted to determine hopping sequences values for each time instance based on the position in the hopping sequence tree, wherein the hopping sequence value at the level n, is dependent on the hopping sequence value associated to the same branch structure on the adjacent level closer to the root of the hopping sequence tree, n−1, and an input sequence associated with the level n.

26. A user equipment adapted for use in a single carrier variable bandwidth communication system, wherein the user equipment is adapted for communication with a base station, and a continuous part of the available frequency spectrum is assigned for the communication, the user equipment comprising radio communication means and further comprising:
   a bandwidth tree storage, adapted to receive and store a representation of a bandwidth tree and representations of input sequences;
   a hopping sequence tree storage, which is in connection with the bandwidth tree storage and adapted to store a representation of a hopping sequence tree which is closely associated with the bandwidth tree, and hopping sequences associated to leafs in the hopping sequence tree;
   An assignment reception module in connection with the radio communication means and the hopping sequences tree storage, said assignment reception module adapted to receive a representation of an assigned bandwidth from a base station;
   a user equipment hopping sequence value module, in connection with the hopping sequence tree storage, the assignment reception module and with the radio communication means, said user equipment hopping sequence value module adapted to determine a hopping sequence value for each time instance of the communication session based on the representation of an assigned bandwidth and using information retrieved from the hopping sequence tree storage, and to output an instruction based on the hopping sequence value of which frequency to use for the coming transmission/reception to the radio communication means.

27. The user equipment according to claim 26, wherein the hopping sequence value module is adapted to determine hopping sequences values for each time instance based on the position in the hopping sequence tree, wherein the hopping sequence value at the level n, is dependent on the hopping sequence value associated to the same branch structure on the adjacent level closer to the root of the hopping sequence tree, n−1, and an input sequence associated with the level n.

* * * * *

UNITED STATES PATENT AND TRADEMARK OFFICE
CERTIFICATE OF CORRECTION

| | | |
|---|---|---|
| PATENT NO. | : 8,223,817 B2 | Page 1 of 2 |
| APPLICATION NO. | : 12/159455 | |
| DATED | : July 17, 2012 | |
| INVENTOR(S) | : Nyberg et al. | |

It is certified that error appears in the above-identified patent and that said Letters Patent is hereby corrected as shown below:

In the Claims:

In Column 13, Lines 11-19, in Claim 9,
delete "$s_k(t;x_1,x_2,5,x_k)=$......................... in which $a\oplus b:=(a+b)\mod 2$." and
insert -- $s_k(t;x_1,x_2,\ldots,x_k)=s_{k-1}(t;x_1,x_2,\ldots,x_{k-1})\cdot 2+a_k(t;x_1,x_2,\ldots,x_k)$
$k=1, 2, \ldots, n$, wherein the leaf at level $k\leq n$ is specified by the vector $(x_1, x_2, \ldots, x_k)$ in which $x_i$ denotes the assigned branch at level i, and to each level i is associated a hopping sequence $s_i(t; x_1, x_2, \ldots, x_i)$ taking values in $\{0, 1, \ldots, 2^i-1\}$, a time index $t=0, 1, 2, \ldots$ is stepped for each hop in the sequence, $a_i(t; x_1, x_2, \ldots, 0)$ is a input sequence from the set of input sequences, and $a_i(t; x_1, x_2, \ldots, 1)=a_i(t; x_1, x_2, \ldots, 0)\oplus 1$ in which $a\oplus b:=(a+b)\mod 2$. --, therefor.

In Column 13, Lines 22-24, in Claim 10, delete "sequence $a_i(t; x_1, x_2, 5, 0)$ is ................. wherein $a_i^{(0)}(t; x_1, x_2, 5, 0)$" and insert -- sequence $a_i(t; x_1, x_2, \ldots, 0)$ is modified according to $a_i^{(b)}(t; x_1, x_2, \ldots, 0)=a_i^{(0)}(t; x_1, x_2, \ldots, 0)\oplus r^{(b)}(t)$ wherein $a_i^{(0)}(t; x_1, x_2, \ldots, 0)$ --, therefor.

In Column 14, Lines 11-17, in Claim 16, delete "recursion $s_k(t; x_1, x_2, 5, x_k)$........................ $a_i(t; x_1, x_2, 5, 1)=a_i(t; x_1, x_2, 5, 0)\oplus 1$" and insert -- recursion $s_k(t; x_1, x_2, \ldots, x_k)=s_{k-1}(t; x_1, x_2, \ldots, x_{k-1})\cdot 2+a_k(t; x_1, x_2, \ldots, x_k)$ $k=1, 2, \ldots, n$, wherein the leaf at level $k\leq n$ is specified by the vector $(x_1, x_2, \ldots, x_k)$ in which $x_i$ denotes the assigned branch at level i, and to each level i is associated a hopping sequence $s_i(t; x_1, x_2, \ldots, x_i)$ taking values in $\{0, 1, \ldots, 2^i-1\}$, a time index $t=0, 1, 2, \ldots$ is stepped for each hop in the sequence, $a_i(t; x_1, x_2, \ldots, 0)$ is a input sequence from the set of input sequences, and $a_i(t; x_1, x_2, \ldots, 1)=a_i(t; x_1, x_2, \ldots, 0)\oplus 1$ --, therefor.

In Column 14, Lines 22-24, in Claim 17, delete "sequence $a_i(t; x_1, x_2, 5, 0)$ is modified .......................... $a_i^{(0)}(t; x_1, x_2, 5, 0)$" and insert -- sequence $a_i(t; x_1, x_2, \ldots, 0)$ is modified according to $a_i^{(b)}(t; x_1, x_2, \ldots, 0)=a_i^{(0)}(t; x_1, x_2, \ldots, 0)\oplus r^{(b)}(t)$ wherein $a_i^{(0)}(t; x_1, x_2, \ldots, 0)$ --, therefor.

In Column 14, Lines 26-27, in Claim 18, delete "in a in a" and insert -- in a --, therefor.

Signed and Sealed this
Twenty-fifth Day of June, 2013

Teresa Stanek Rea
*Acting Director of the United States Patent and Trademark Office*

CERTIFICATE OF CORRECTION (continued)
U.S. Pat. No. 8,223,817 B2

In Columns 14-15, Lines 62-67 & 1-2, in Claim 20, delete "recursion $s_k(t; x_1, x_2, 5, x_k)=s_{k-1}(t; x_1, x_2, 5, x_{k-1}) \cdot 2$ .................................... and $a_i(t; x_1, x_2, 5, 1)=a_i(t; x_1, x_2, 5, 0) \oplus 1$" and insert -- recursion $s_k(t; x_1, x_2, ..., x_k)=s_{k-1}(t; x_1, x_2, ..., x_{k-1}) \cdot 2 + a_k(t; x_1, x_2, ..., x_k)$ k=1, 2, ..., n, wherein the leaf at level k≤n is specified by the vector $(x_1, x_2, ..., x_k)$ in which $x_i$ denotes the assigned branch at level i, and to each level i is associated a hopping sequence $s_i(t; x_1, x_2, ..., x_i)$ taking values in $\{0, 1, ..., 2^i-1\}$, a time index t=0, 1, 2, ... is stepped for each hop in the sequence, $a_i(t; x_1, x_2, ..., 0)$ is a input sequence from the set of input sequences, and $a_i(t; x_1, x_2, ..., 1)=a_i(t; x_1, x_2, ..., 0) \oplus 1$ --, therefor.

In Column 15, Lines 6-7, in Claim 21, delete "sequence $a_i(t; x_1, x_2, 5, 0)$ is modified ................ $a_i^{(0)}(t; x_1, x_2, 5, 0)$" and insert -- sequence $a_i(t; x_1, x_2, ..., 0)$ is modified according $a_i^{(b)}(t; x_1, x_2, ..., 0)=a_i^{(b)}(t; x_1, x_2, ..., 0) \oplus r^{(b)}(t)$ wherein $a_i^{(0)}(t; x_1, x_2, ..., 0)$ --, therefor.

In Column 16, Line 24, in Claim 26, delete "An" and insert -- an --, therefor.